United States Patent
Sherman et al.

[11] Patent Number: 5,976,296
[45] Date of Patent: Nov. 2, 1999

[54] TRANSFER PRINTING OF COMPLEX OBJECTS

[75] Inventors: Louis R. Sherman, Botkins; Dennis S. Baker, Tipp City; Dale E. Whetstone, St. Marys; Gary T. McCarel, Troy; Steven R. Woolley, Sydney, all of Ohio

[73] Assignee: American Trim, LLC, Lima, Ohio

[21] Appl. No.: 09/067,488

[22] Filed: Apr. 27, 1998

[51] Int. Cl.⁶ .......................... B44C 1/165; B32B 31/00; B41M 3/12; B05D 3/02
[52] U.S. Cl. .................. 156/230; 156/232; 156/240; 156/241; 156/247; 156/86; 428/914; 427/189
[58] Field of Search ..................... 156/230, 231, 156/232, 233, 234, 235, 237, 238, 239, 240, 241, 247, 277, 289, 86; 428/913, 914; 427/180, 189, 195; 264/230

[56] References Cited

U.S. PATENT DOCUMENTS

| | | | |
|---|---|---|---|
| 3,705,166 | 12/1972 | Murayama et al. | 260/293.86 |
| 4,145,512 | 3/1979 | Uhrhan et al. | 528/73 |
| 4,153,596 | 5/1979 | Oertel et al. | 260/45.8 N |
| 4,205,151 | 5/1980 | Dale et al. | 526/262 |
| 4,210,612 | 7/1980 | Karrer | 525/204 |
| 4,395,263 | 7/1983 | Davis | 8/471 |
| 4,491,494 | 1/1985 | Davis, Jr. et al. | 156/240 |
| 4,587,155 | 5/1986 | Durand | 428/195 |
| 4,668,239 | 5/1987 | Durand | 8/471 |
| 4,670,084 | 6/1987 | Durand | 156/540 |
| 4,804,717 | 2/1989 | Ramey et al. | 525/375 |
| 4,895,901 | 1/1990 | Ramey et al. | 525/127 |
| 5,236,527 | 8/1993 | Brodsky | 156/85 |
| 5,290,424 | 3/1994 | Mozelewski et al. | 205/160 |
| 5,318,942 | 6/1994 | Laudy et al. | 503/227 |
| 5,718,792 | 2/1998 | Goode | 156/228 |

FOREIGN PATENT DOCUMENTS

| | | | |
|---|---|---|---|
| 1108929 | 9/1981 | Canada | 428/209 |
| 9221514 | 12/1992 | WIPO | 503/227 |

OTHER PUBLICATIONS

Newman, Robert B., "Sublimaiton Printing on Unsealed Aluminum Metal," *Light Metal Finishing, Session K*, pp. 1–6.

Untitled Paper, Sublimation System, Inc. (Cicra 1979).

Stahls' 1993–1994 Buyers's Guide, "Personalization Pays!", pp. 1–3, 38 and back cover.

*Primary Examiner*—James Sells
*Assistant Examiner*—J. A. Lorengo
*Attorney, Agent, or Firm*—Rankin, Hill, Porter & Clark LLP

[57] ABSTRACT

The present invention provides a process for transfer printing and decorating metal objects of complex configuration. The process yields decorated objects with high clarity and uniformity of print quality. The process includes the steps of providing an object of complex configuration having a layer of thermosetting coating material formed thereon, aligning and fixing a piece of transfer paper having a transferable image formed thereon over the layer of coating material, placing a section of heat shrinkable plastic film over the transfer paper, and then heating the object so as to cause the film to shrink and facilitate the transfer of the image into the coating material.

8 Claims, 1 Drawing Sheet

TRANSFER PRINTING OF COMPLEX OBJECTS

BACKGROUND OF THE INVENTION

1. Field of the Invention

This invention concerns the decoration of metal surfaces of complex configuration. More particularly, this invention relates to transfer printing of metal objects of complex configuration.

2. Background Art

Transfer printing of inks or dyes into a variety of articles such as shirts, mugs, plastic articles and plastic coated substrates is well-known in the art. Dispersible dye crystals or inks are printed in reverse images in transfer paper which is to be used to transfer print the article to be decorated. The article to be decorated is usually made of plastic or has a plastic or polymer coating on it into which the dyes are transferred.

Most transfer printing is referred to as sublimation printing in which the dyes are said to sublimate under heat and pressure to be driven into any receptive substrate that is put in contact with the transfer paper. Such sublimation printing was developed circa 1969 and has been used extensively to print many articles including plastic coated metal substrates.

Transfer printing also includes a melt printing process which is as described in several patents and patent applications including U.S. Pat. Nos. 4,587,155; 4,670,084; 4,668,239 and Published Application WO 92/21514. According to U.S. Pat. No. 4,587,155, the desired dye image is transferred from the paper to the substrate by heating the dye to a temperature above its melting point but below its vaporization temperature so that the dye will diffuse into the softened plastic substrate. Published Application WO 92/21514 describes melt printing of planar metal base members such as aluminum, steel or the like which have been coated on at least one planar surface with a melt printable layer of softenable, dye-permeable, thermoplastic or thermoset material such as polyethylene terephthalate, polybutylene terephthalate or other thermoplastic polyesters, polycarbonates, nylons and the like. Application WO 92/21514 further describes bilayer coatings of thermoplastic or thermoset materials including a base coat optimally provided with a pigment and a second layer that can comprise a clear resin. The application states that neither the composition nor the thickness of either the substrate or the printable plastic layers is critical.

Canadian Patent 1,108,929 describes a process for applying designs to unsealed, anodized aluminum which is continuously heated to a temperature at which colored components of ink will sublime. The heated strip is fed into contact with an ink carrying web so the ink is heated and transferred into the anodized aluminum surface. The decorated aluminum strip is then cooled with water and passed through a sealing bath filled with a sealing solution such as buffered aqueous nickel.

Unfortunately, none of these references provide any insight into how to produce a high-quality image on a metal object of complex configuration such as a metal sphere or a tapered cylinder. An improved process is needed for transfer printing metal objects of complex shape in order to produce objects having consistent bright coloring with little or no texturing of the surface of the object.

SUMMARY OF THE INVENTION

This invention provides a process or method for transfer printing metal objects of complex configuration resulting in decorative or informative images of high quality. The term "complex configuration" as used herein means any object having one or more surfaces that are nonplanar. The process allows the transfer printing paper that is being employed to fully conform to the shape of the object that is being decorated. Thus, the process allows one to produce a pattern or image on the object that appears continuous, and essentially the entire surface of the object may be decorated.

The method includes the steps of providing an object of complex configuration having a complex surface including a layer of polymeric coating material formed thereon, aligning and fixing a piece of transfer paper having a transferable image formed thereon over the layer of coating material, disposing a piece of heat shrinkable film over the transfer paper, and then heating the object so as to cause the film to shrink and thus facilitate the transfer of the image on to the layer of polymeric coating material. Preferably, the layer of polymeric coating material comprises a pigmented base coat formed of a heat curable thermoset resin. More preferably, the layer of polymeric coating material comprises a pigmented base coat and a clear topcoat, both formed of a heat curable thermosetting resin. The heating step is generally performed at a temperature of from about 300° F. to about 400° F. for a period of from about 5 to 20 minutes. Of course, the exact heating parameter will be a function of the size of the object, and the specific coating materials and transfer printing papers that are employed.

The objects and advantages of this invention will be more fully understood and appreciated with reference to the following description and the claims appended hereto.

DESCRIPTION OF PREFERRED EMBODIMENTS

Figure 1:
FIG. 1 is a side view of an object of complex configuration that may be decorated in accordance with the process of the present invention.

Referring to the drawings, and initially to FIG. 1, there is illustrated a metal object of complex configuration 10 that may be transfer printed in accordance with the principles of the present invention. As shown in FIG. 1, complex object 10 comprises a hollow cylinder of tapered diameter which is more commonly known as a bat formed of a conventional grade of aluminum such as, for example, 7046, 7050 or C405. The cylinder is produced using conventional forming techniques such as swagging. Prior to decorating, the bat may be heat treated to produce the desired physical properties.

The adaptation of current transfer printing practices to decorate an object of complex configuration would lead one to utilize a mold shaped like the object to be decorated. The mold would probably be lined with a sponge like material so as to configure to the shape of the object. However, applicants have found that this approach is not very effective due to its inability to fully configure to the surface of the object and provide uniform pressure along the entire surface of the transfer paper. However, the method of the present invention avoids all of the deficiencies noted with this type of an approach.

In the method of the present invention the transfer paper is allowed to conform completely to the surface being decorated and essentially the entire surface of the object may be decorated. Generally, the method includes the steps of aligning a piece of transfer paper (which has the transferable image formed thereon) over the surface of the object to be decorated, disposing and fixing a piece of heat shrinkable film over the transfer paper and heating the object so as to cause the heat shrinkable film to shrink and apply pressure against the transfer paper facilitating the transfer of the image to the surface of the object. The transfer paper is die cut to size to conform to the configuration of the object being decorated.

The surface of the object that is being printed preferably comprises a base coat and a topcoat formed on the surface of the metal object. The base coat may be selected from a variety of thermosetting polymer coating materials such as polyester, epoxies, acrylics or the like, and preferably it is pigmented with, for example, titanium dioxide in order to provide a solid color background for printing. The topcoat may also be selected from a variety of thermosetting polymers such as polyesters, epoxies and acrylics. If a topcoat is employed, it should be substantially clear so as not to screen or interfere with the visibility of the transfer inks or dyes which will be diffused into the coating. It will be appreciated that the base coat and top coat may comprise liquid paints or powder coatings, and any one of a variety of appropriate application techniques may be employed such as spraying, dipping, electrostatic spraying, rolling, etc.

It is important that the coatings that are employed are ones that will not soften when the coated material is heated such as during the transfer printing operation. Preferably, the coatings are comprised of polymers that are not soluble in solvents or the like that can cause discoloration or degradation of the coatings.

Optionally, the topcoat may be provided with an overcoat that serves as a protective coating. The overcoat is also preferably a clear thermosetting polymer such as a polyester, acrylic an epoxy or the like. Preferably, the overcoat for certain applications includes a UV stabilization additive where UV light degradation is an issue or concern.

In most applications, preferably both the base coat and the topcoat have a thickness of from to about 0.0004" to about 0.006". When an overcoat is utilized, preferably the overcoat is applied to a thickness of from about 0.0004" to about 0.004" and preferably from about 0.0004" to about 0.003". Applicants hereby incorporate U.S. application Ser. No. 08/990,652 entitled TRANSFER PRINTING OF METAL USING PROTECTIVE OVERCOAT for its teachings relative to the application and use of base coats, topcoats, overcoats and for its general teachings relative to the transfer printing of metal objects.

Referring once again to FIG. 1, the surface of bat 10 includes a base coat formed of a thermosetting polyester powder coating material distributed by Morton International, Inc. of Reading, Pennsylvania, under the trade designation Corvel White U-1578-1-1007. The bat also includes a topcoat formed on top of the base coat of a clear thermosetting epoxy powder coating material distributed by Morton International, Inc. under the trade designation Corvel Clear. The base coat and top coat are applied using conventional electrostatic powder coating application techniques. When powder coatings are employed, preferably the base coat and topcoat have a thickness of about 0.002" to about 0.003".

Figure 2:
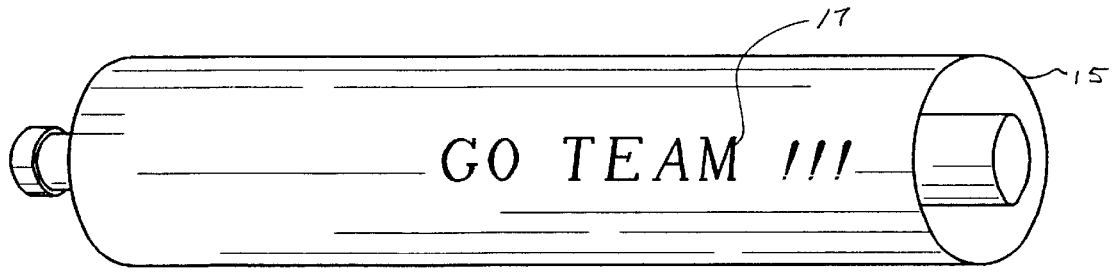
FIG. 2 is a side view of the object of FIG. 1 with a section of transfer paper being aligned on the object.
Figure 3:
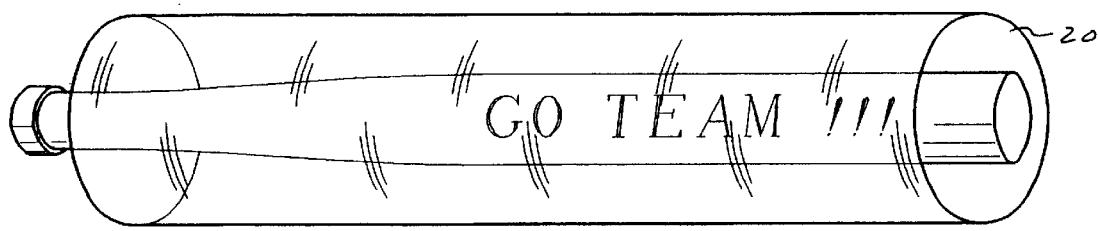
FIG. 3 is a side view of the object of FIG. 2 after application of the shrink wrap film.

As shown in FIG. 2, bat 10 is first wrapped with a section of transfer paper 15 that includes the decorative image 17. Care must be taken to align the transfer paper properly around the bat 10. Preferably, the transfer paper is designed and sized using the fundamental theorem of calculus. More particularly, in order to achieve a two-dimensional representation of a three-dimensional object it is necessary to divide that object into an infinite number of strips and take the limit of this function as the width of the strip goes to zero and the number of strips goes infinite. While this is fine in theoretical applications, for applied science or actual applications it was found that one needed to maximize a function (one representing the covered surface area) while minimizing the number of strips. It was determined that for a tapered cylinder or bat four legs (8 symmetric functions) were the most that was practical from a production standpoint and that was used as the first design parameter.

The only parameters exclusive to the bat where length and diameter at regular intervals along the taper. These values were entered into a matrix with the corresponding position along the length and divided by eight (the number of symmetric sections used). A point plot of the matrix was created to check accuracy against the derived function. It was then possible to create a function $F1(x)$ that represented the necessary curves intersecting the points that were calculated. It should be noted that the least square curve fitting method was employed. The applicants' original thought was to use a derivative of the Newton-Raphson method for root finding, but the results tended to divergence on higher order functions. Thus, both a cubic and a quadratic equation were run to compare again divergence criteria. In this particular situation the cubic is a closer approximation. One can then observe the behavior of the derivative of function in order to determine points of inflection. These points will cause two-dimensional interference which could result in wrinkling of the transfer paper.

Upon alignment of the transfer paper 15, it is preferably fixed in place at several locations at each end using a heat resistant masking tape. An example of a suitable tape is a heat resistant tape sold by Innotec of Racine, Wis. 53404, under the trade designation PG-21. A section of heat shrinkable plastic film 20 is then wrapped or placed over the transfer paper 15. The film may comprise any of those conventionally utilized in shrink packaging, such as polyvinyl chloride (PVC), polyethylene, polypropylene and the like having approximately equal shrink coefficients in the transverse and longitudinal directions (biaxially-oriented). An example of a specific suitable PET film is 0.002" film sold by the Mikaflex Corporation of Amherst, N.Y. 14226, under the designation PET-G. Care must be taken to ensure that the shrinkable film 20 covers the entire surface of the transfer paper 15. Upon application of the film 20, the bat 10 is then ready for heating.

Figure 4:
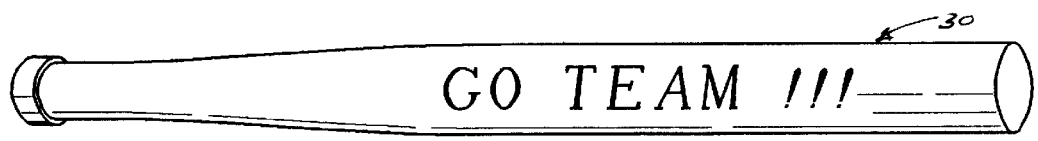
FIG. 4 is a side view of the object of FIGS. 1–3 after completion of the method of the present invention.

More particularly, the bat 10 is placed in an oven on a rack and heated to about 350° C. for a period of about 11–15 minutes, depending on the size of the bat. During heating the shrinkable film shrinks and presses the transfer paper against the outer surface of the bat 10. The heat and pressure causes the sublimation of the dye or dyes that form the image into the topcoat on the surface of the bat 10. After heating the bat is removed from the oven and then allowed to cool. The shrink wrap film 20 may be easily removed cutting a portion of the film 20 and transfer paper 15 with a razor knife, and then tearing the paper and film from the bat to provide a decorated bat 30 as shown in FIG. 4. Subsequent to decoration, items such as rubber tips and a rubber handle may be easily added to the bat.

It will be appreciated that the configuration of the object that is being decorated pursuant to the methods of the present invention may be one of any various shapes, and it is in no way limited to the tapered cylinder configuration that is shown in the figures. For example, the object may comprise a shape resembling a cylinder, a cone, etc. Also, it will be appreciated that the object being decorated may comprise any type of metal such as, for example, steel, stainless steel, iron, brass, etc. Further, any type of thermoset materials may be used to form the coating on the surface of the object being decorated other than the powder coating materials described above. For example, water base and solvent base thermoset coating systems may also be employed. Additionally, it will be appreciated that it may be possible to form a pigmented base coat and a clear topcoat using a single application of coating material that is specially formulated to provide during curing a pigmented base layer and a clear top layer. Alternatively, for certain applications wherein a high quality image may not be required, it may be suitable to transfer print directly on a pigmented layer, thereby foregoing the use of a second clear layer.

Although the invention has been disclosed in its preferred embodiment with a certain degree of particularity, it will be understood that the present disclosure of the preferred embodiment has been made only by way of example and that various changes may be resorted to without departing from the true spirit and scope of the invention as hereinafter claimed. It is intended that the patent shall cover, by suitable expression in the appended claims, whatever degree of patentable novelty exists in the invention disclosed.

What is claimed is:

1. A method of producing a transfer printed object having a complex surface comprising the steps of:

A. providing an object having a complex surface including a layer of thermosetting coating material formed thereon;

B. aligning a piece of transfer paper having a transferable image formed thereon over said layer of thermosetting coating material;

C. disposing and fixing a piece of heat shrinkable plastic film over said transfer paper; and D. heating said object so as to cause said shrinkable film to shrink and facilitate the transfer of said image to said layer of thermosetting coating material.

2. A method as set forth in claim 1 wherein said layer of thermosetting coating material comprises a pigmented thermosetting material.

3. A method as set forth in claim 1 wherein said layer of thermosetting coating material comprises a base coat containing a pigment and a clear topcoat covering said base coat.

4. A method as set forth in claim 1 wherein said layer of thermosetting coating material is formed using powder coating materials.

5. A method as set forth in claim 3 wherein said base coat and said topcoat both comprise a thermosetting polymer resin.

6. A method as set forth in claim 1 wherein during said Step D said object is heated to a temperature of about 300° F. to about 400° F. for a period of from about 5 to about 20 minutes.

7. A method as set forth in claim 1 wherein during said Step B said transfer paper is fixed into position on said object utilizing tape.

8. A method as set forth in claim 7 wherein said tape comprises a heat resistant masking tape.

* * * * *